(12) United States Patent
Williams et al.

(10) Patent No.: US 9,041,334 B2
(45) Date of Patent: May 26, 2015

(54) MOTOR CONTROL WITH VOLTAGE HARMONIC SHAPING

(75) Inventors: Connel Brett Williams, West Midlands (GB); Christopher David Dixon, Coventry (GB); Robert James Huxford, Birmingham (GB)

(73) Assignee: TRW Limited, West Midlands (GB)

( * ) Notice: Subject to any disclaimer, the term of this patent is extended or adjusted under 35 U.S.C. 154(b) by 215 days.

(21) Appl. No.: 13/641,498

(22) PCT Filed: Apr. 14, 2011

(86) PCT No.: PCT/GB2011/050748
§ 371 (c)(1),
(2), (4) Date: Jan. 23, 2013

(87) PCT Pub. No.: WO2011/128695
PCT Pub. Date: Oct. 20, 2011

(65) Prior Publication Data
US 2013/0193898 A1    Aug. 1, 2013

(30) Foreign Application Priority Data

Apr. 16, 2010 (GB) .................................. 1006404.6

(51) Int. Cl.
| | |
|---|---|
| *H02P 1/00* | (2006.01) |
| *H02P 1/28* | (2006.01) |
| *H02P 3/00* | (2006.01) |
| *H02P 6/00* | (2006.01) |
| *H02P 21/06* | (2006.01) |
| *G05B 5/01* | (2006.01) |
| *H02P 21/05* | (2006.01) |
| *H02P 29/00* | (2006.01) |
| *H02P 21/00* | (2006.01) |

(52) U.S. Cl.
CPC ............... *H02P 6/002* (2013.01); *H02P 21/06* (2013.01); *G05B 5/01* (2013.01); *H02P 21/05* (2013.01); *H02P 29/0038* (2013.01); *H02P 21/0035* (2013.01)

(58) Field of Classification Search
CPC .......................... H02P 21/06; H02P 21/0035
USPC ........................................................ 318/504
See application file for complete search history.

(56) References Cited

U.S. PATENT DOCUMENTS

| 6,861,813 B2 * | 3/2005 | Yoshimoto et al. ........... 318/432 |
| 7,449,859 B2 * | 11/2008 | Bae et al. ..................... 318/807 |

(Continued)

FOREIGN PATENT DOCUMENTS

| WO | 03041260 A1 | 5/2003 |
| WO | 2009091015 A1 | 7/2009 |
| WO | 2011107773 A2 | 9/2011 |

OTHER PUBLICATIONS

International Search Report for International Application No. PCT/GB2011/050748 dated Aug. 2, 2012.

*Primary Examiner* — Erick Glass
(74) *Attorney, Agent, or Firm* — MacMillan, Sobanski & Todd, LLC

(57) ABSTRACT

A control system for an electric motor comprises a current sensing means arranged to produce a current sensing output indicative of electric current in the motor, current control means arranged to receive the current sensing output and to output a voltage demand indicative of voltages to be applied to the motor, and voltage demand correction means arranged to generate a correction signal and to use the correction signal and the voltage demand to produce a corrected voltage demand.

8 Claims, 3 Drawing Sheets

(56) References Cited

U.S. PATENT DOCUMENTS

| | | | |
|---|---|---|---|
| 8,143,837 B2* | 3/2012 | Ide | 318/802 |
| 8,446,115 B2* | 5/2013 | Yabuguchi et al. | 318/400.02 |
| 8,736,206 B2* | 5/2014 | Kono et al. | 318/400.02 |
| 2003/0001536 A1 | 1/2003 | Kitajima | |
| 2003/0052641 A1 | 3/2003 | Yoshimoto et al. | |
| 2004/0195993 A1 | 10/2004 | Yoshimoto et al. | |
| 2011/0214934 A1 | 9/2011 | Ueda et al. | |

* cited by examiner

US 9,041,334 B2

MOTOR CONTROL WITH VOLTAGE HARMONIC SHAPING

CROSS-REFERENCE TO RELATED APPLICATIONS

This application is a national stage of International Application No. PCT/GB2011/050748 filed Apr. 14, 2011, which claimed priority to Great Britain Patent Application No. GB 1006404.6 filed Apr. 16, 2010, the disclosures of which are incorporated herein by reference in entirety.

BACKGROUND OF THE INVENTION

The present invention relates to the control of electric motors, and in particular to the control of harmonics in the voltages applied to the windings of electric motors. It can be used, for example, to correct harmonic errors in the voltages output by motor drivers, and to add harmonics to the voltages input to the motor to correct harmonic variations in the torque output of the motor.

A closed loop current controller for an electric actuator typically takes the form shown in FIG. 1. Using vector control in response to a requested target current, a voltage is applied to each phase winding of the motor and the resultant generated currents measured. The measured currents are then used by a controller, typically a PI controller, to control to the requested voltage to achieve the target current. A signal which gives the electrical position of the motor is also required so that the voltages can be applied at the correct phases at the correct times. In the system of FIG. 1 a position sensor is shown but the present invention is equally applicable to a position sensorless system, where the position signal is estimated from other sensor measurements.

Typically for a 3 phase motor the driver comprises a 6 FET bridge arranged to apply a known voltage to the motor terminals in a PWM pattern to achieve the desired closed loop current. Due to the PWM switching patterns that are applied to the motor to produce the desired voltage, drive stage non-linearities in the form of additional unwanted harmonic frequencies can be introduced as shown in FIG. 2.

BRIEF SUMMARY OF THE INVENTION

The present invention provides a control system for an electric motor, the system comprising a current sensing means arranged to produce a current sensing output which may be indicative of electric current in the motor, and current control means which may be arranged to receive the current sensing output and to output a voltage demand, which may be indicative of voltages to be applied to the motor. The system may further comprise voltage demand correction means. The voltage demand correction means may be arranged to generate a correction signal. It may be arranged to produce a corrected voltage demand, in some cases by using the correction signal and the voltage demand.

The voltage demand correction means may be arranged to monitor the current sensing output thereby to measure distortion in the voltage demand, and may be arranged to generate the correction signal so as at least partly to correct the distortion.

The correction means may be arranged to identify a distortion frequency. It may be arranged to generate the correction signal so as to vary a component of the voltage demand at the distortion frequency. For example it may be arranged to identify a component of the current sensing output having a frequency equal to the distortion frequency, and to measure the magnitude of that component to measure the distortion. In that case it may be arranged to transform the current sensing output so that the identified component, or at least a part or component of the identified frequency component, becomes a DC component, and to measure the magnitude of the DC component. It may be arranged to transform the identified component to two DC components. These two components may, for example, correspond to two different phase components of the identified frequency component, such as the D and Q axis components, or the α and β components.

The correction means may be arranged to generate the correction signal so as to reduce the identified component, or it may be arranged to increase the identified component. The reduction or increase may be by a variable amount so as to correct for measured distortion, or it may be by a fixed amount, for example to correct for a known distortion of the system. For example it may be arranged to generate the correction signal at a fixed magnitude so as to correct a torque harmonic of the motor.

The correction means may be arranged to combine the correction signal with the voltage demand to produce the corrected voltage demand.

The motor may have stationary windings and a rotor which rotates relative to the windings. The current sensing means may comprise a current sensor arranged to measure current in the motor windings, and may comprise transformation means arranged to transform the measured current into the frame of reference of the rotor. The current sensing output may define the current in a frame of reference which is rotating, for example the rotor frame of reference having D and Q components, or in a frame of reference that is fixed, having α and β components.

The current control means may be arranged to output the voltage demand so as to define a demanded voltage in a frame of reference which is rotating, for example the rotor frame of reference having D and Q components, or in a frame of reference that is fixed, having α and β components.

The system may be arranged to correct a plurality of components of distortion. The components of distortion may be harmonics having different frequencies and/or different signs.

Other advantages of this invention will become apparent to those skilled in the art from the following detailed description of the preferred embodiments, when read in light of the accompanying drawings.

DETAILED DESCRIPTION OF THE INVENTION

Figure 1:
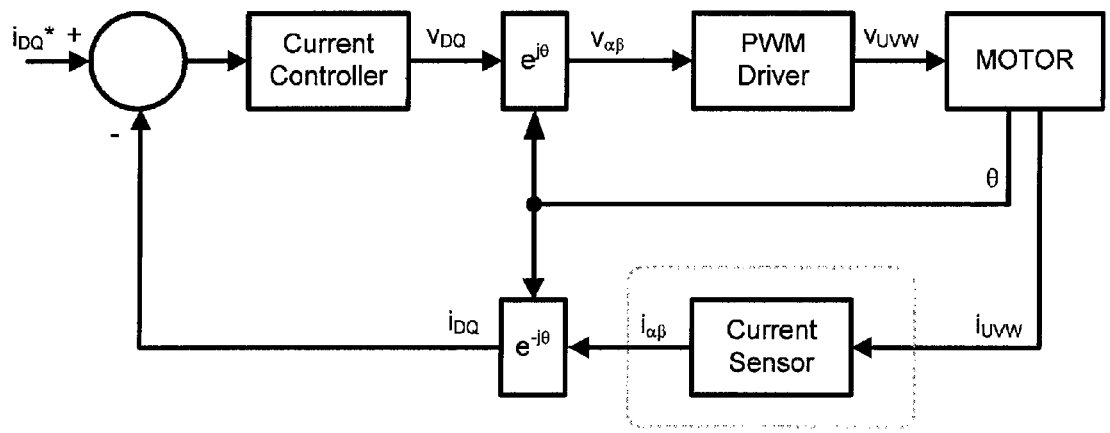
FIG. 1 is a diagram of a known closed loop current control system for a motor.
Figure 2:
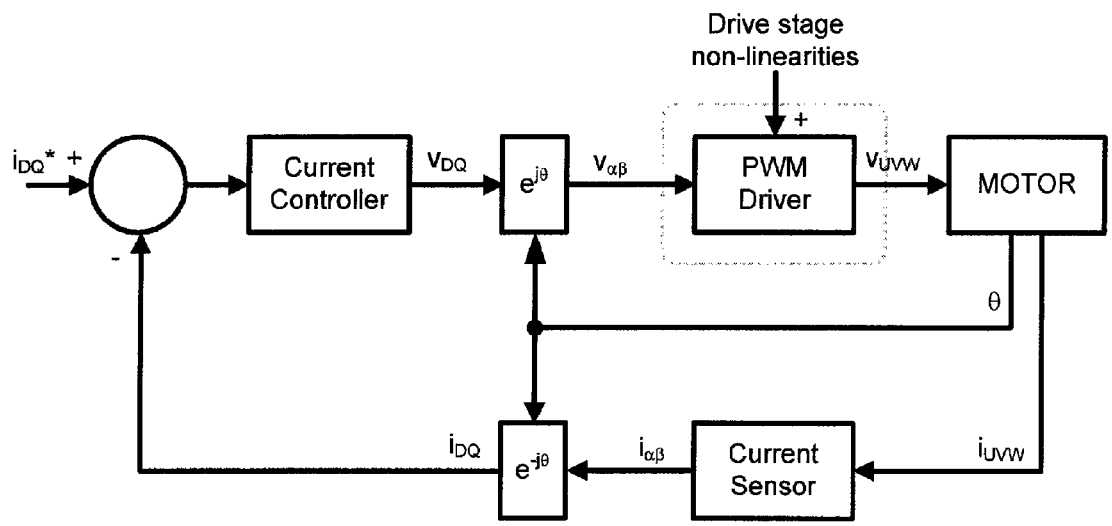
FIG. 2 is a diagram showing how harmonic errors generated in the motor driver affect the system of FIG. 1.
Figure 3:
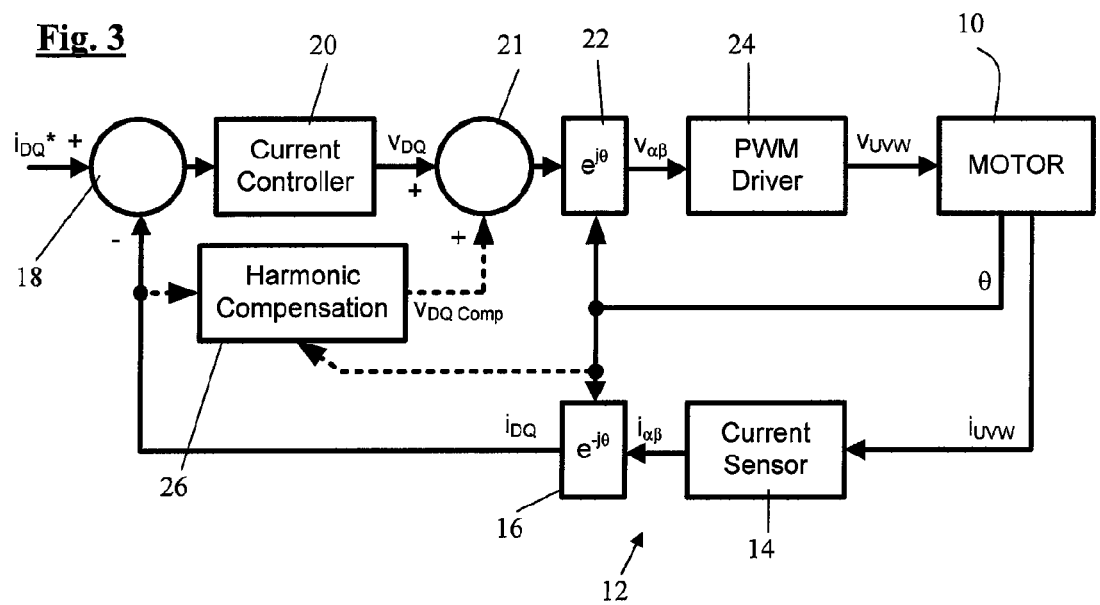
FIG. 3 is a diagram of a closed loop current control system for a motor according to an embodiment of the invention.

Referring to FIG. 3 a motor 10 is controlled by a closed loop motor current control system according to an embodiment of the invention, which comprises a current sensing system 12 and a current controller 20. The current sensing system 12 comprises a current sensor 14 arranged to measure the currents $i_U$, $i_V$, $i_w$ in the three phases of the motor, which comprise stationary windings, and output a signal indicative of the current vector in the stationary coordinates having α and β components. The current sensing system further comprises a coordinate transformation block 16 arranged to convert the current vector from the α and β components in the stationary reference frame, to D and Q components $i_D$ and $i_Q$ defining the current vector in the rotor reference frame, which rotates relative to the fixed windings, with the Q axis current being the torque generating component and the D axis current being non-torque generating. A comparator 18 receives the measured D and Q currents from the current sensing system 12 and compares them with demanded D and Q current components to generate a current error. The current controller 20 receives the current error and outputs a demanded voltage vector, in the form of a D and Q axis voltage demand $V_{DQ}$ calculated to reduce the current error so that the measured current vector $I_{DQ}$ approaches the demanded current vector $i_{DQ}*$. A further transformation block 22 receives the voltage demand from the current controller and converts it to α and β components $V_{αβ}$ which are input to a PWM driver 24 which comprises a 6 FET bridge and is arranged to control the FET switches to apply voltages to the phase windings of the motor in a PWM pattern which produces the net voltage in the windings having a magnitude and direction corresponding to the voltage demand vector.

The motor driver 24 in this system produces harmonic interferences as described above. The harmonic errors are not observable in the voltage demand output by the current controller 20. However, it will be observable on the current sensor signal output from the current sensing system 12.

The control system therefore further comprises a harmonic compensation controller 26 arranged to provide a harmonic compensation function. To achieve this the harmonic compensation controller 26 is arranged to monitor the measured currents, in this case by monitoring $I_{DQ}$, thereby to measure the harmonic interference, and apply a correction, using and adder 21, to the voltage demand output by the current controller 20 such that the harmonic error is removed. The harmonic compensation controller 26 is also arranged to receive a motor position input signal θ to enable it to detect the position of the motor.

Figure 4:
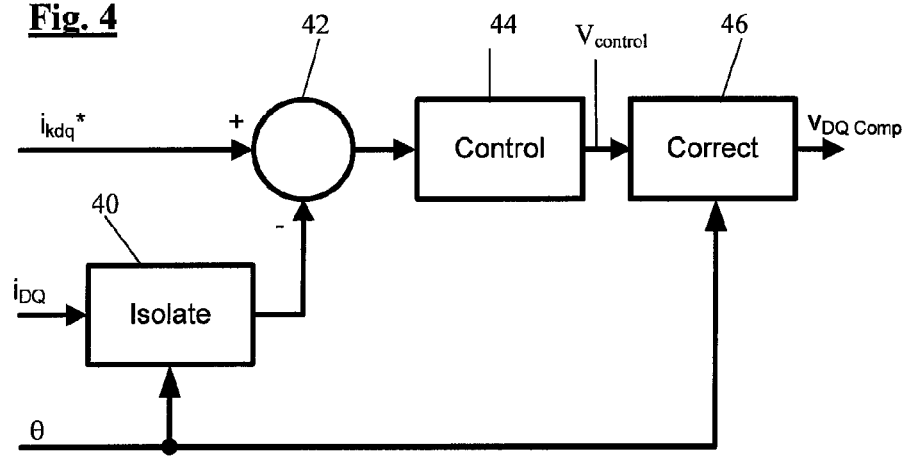
FIG. 4 is a diagram of the harmonic compensation system forming part of the system of FIG. 4.

Referring to FIG. 4 the harmonic compensation process can be broken down into three steps which are shown as functional blocks of the harmonic compensation controller 26:

1. Isolation—an isolation block 40 is arranged to monitor the measured currents in the motor and isolate the unwanted frequencies.

2. Control—a control block 44 is arranged to use a closed loop current control system to generate a control (cancellation) signal indicative of the level of harmonic correction required such that the unwanted harmonics are reduced to zero, or such that other harmonics are injected at a required level, as defined by an isolation frequency demand signal $i_{kDQ}*$.

3. Correct—a correction block 46 is arranged to apply a correction to the voltages applied to the motor, based on the control (cancellation) signal.

Isolation

Although a number of techniques may be used to isolate the unwanted harmonics, such as a runtime Fast Fourier Transform (FFT) or notch filter, the approach used in this embodiment is to use a synchronous filter that is arranged to transform the measured current to the isolation frequency reference frame. This allows the unwanted harmonic, which is in this case assumed to be a single harmonic of known frequency, to be isolated simply.

Figure 5:
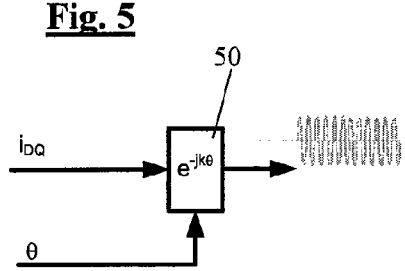
FIG. 5 is a diagram of a synchronous filter forming part of the system of FIG. 3.

FIG. 5 shows one implementation of a synchronous filter 50, which receives as inputs the current sensor output $I_{DQ}$, the motor electrical position θ and the harmonic k (relative to the motor electrical frequency) to be isolated. Note that k can be positive or negative depending on whether the targeted harmonic is a positive or negative sequence component (i.e. whether it travels in the same direction as the rotor or the opposite direction).

The transformation $e^{jkθ}$ performed by the filter 50 is defined as:

$$y(t) = e^{jkθ}u(t) = \begin{bmatrix} \cos(kθ) & \sin(kθ) \\ -\sin(kθ) & \cos(kθ) \end{bmatrix} u(t)$$

where u(t) is the input to the filter 40, y(t) is the output, and θ is the electrical position of the motor.

Figure 6:
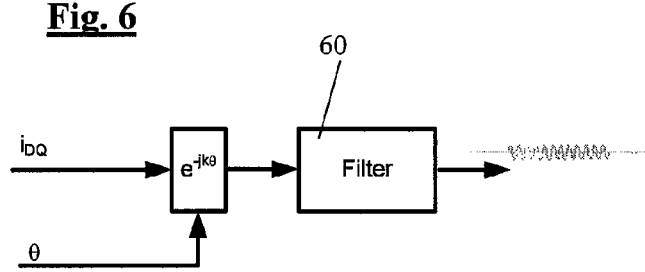
FIG. 6 is a diagram of a filter arrangement similar to that of FIG. 5 but with a further filter component.

The transformed signal output by the synchronous filter 50 will contain DC and AC components. The DC component is the quadrature component of the target harmonic. The AC components are caused by all of the other harmonics in the original signal. If the DC component is zero then the isolation frequency, or at least a quadrature (Q) component at that frequency, is not present in the current controller output voltages. As shown in FIG. 6, if necessary a filter 60 may be added to the control path at the output of the synchronous filter 50 to help to attenuate the unwanted AC components so that the DC component can be more easily isolated. The phase (D) component of the isolation frequency can, if required, be identified with a further filter and converted into a separate DC signal.

Control

As previously shown in FIGS. 5 and 6, the synchronous filter produces a signal where the DC component is the magnitude of the isolated harmonic k. If the DC component is zero then the harmonic is not present.

The aim of the control function of the harmonic compensation unit 26 is therefore to generate a signal(s) which is indicative of the level of harmonic compensation required to reduce the DC component to zero. It therefore receives the output from a comparator which compares the output from the synchronous filter with an isolation frequency demand signal $i_{kdq}*$. The isolation frequency demand signal can be set to zero if the isolated frequency is to be removed. The control block is then arranged to generate a control signal $V_{control}$ which indicates the degree of correction of the voltage demand signal that is required. A number of controllers may be used but the preferred solution is a controller of the standard PID form. To remove the inverter non-linearity the current demands in the harmonic frame, $i_{kdq}*$ are set to zero for removal of just inverter non-linearity. As will be described below, non-zero values of the isolation frequency demand signal can also be used.

For systems with limited voltages available the decision must be made as to which controller has priority, i.e. whether the current controller 20 or the harmonic compensation controller 26 has priority. One solution used in this embodiment is to allow the harmonic compensation to operate without limit and reduce, where applicable, the standard current controller operating limit. This is implementation specific and other embodiments can be configured to give priority to the current controller (and limit the harmonic compensation control action).

Correction

Figure 7:
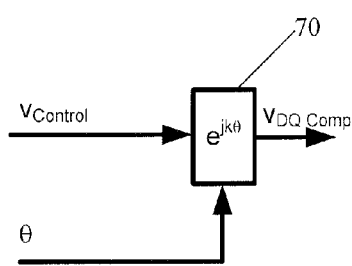
FIG. 7 is a diagram of a correction part of the system of FIG. 3.

Once the control action has been calculated the corrective action must be applied to the demanded voltages. There are many ways to achieve this, such as the use of an inverse FFT but the preferred solution is shown in FIG. 7, and comprises a transformation block 70. The control signal $V_{control}$ is a DC signal indicative of the magnitude of the unwanted harmonic, and is input to the transformation block 70 which is arranged to transform it back to the dq reference frame to produce a compensation voltage $V_{DQcomp}$, which will be an AC signal at the unwanted harmonic frequency. The adder 21 of FIG. 3 is arranged to add the compensation voltage to the standard current control voltage demands $V_{DQ}$ applied to the motor.

Whereas in the system of FIG. 3 the D and Q axis current sensing signal is monitored and the D and Q axis voltage demand corrected, it is equally possible for the correction to be carried out in the fixed reference frame with the α and β components of the current sensor output being monitored and the voltage demand being corrected after it has been transformed to α and β components.

Active Harmonic Shaping

Although the compensation scheme described above can be used to remove a harmonic from the voltages applied to the motor, the opposite case can also occur. The system of FIG. 3 provides the ability to inject a harmonic of a particular phase and magnitude into the voltages applied to the motor. Referring back to FIG. 4, the current demands in the harmonic frame, $i_{kdq}$* instead of being set to zero can be set to produce the correct magnitude and phase for the harmonic to be applied. The harmonic correction block 26 uses the motor position signal θ to generate the correction signal in the D,Q axis reference frame at the correct frequency and phase.

One application for this is to remove a torque harmonic, i.e. a variation in the torque output of the motor at a harmonic of the motor speed, that is inherent in the design of a particular motor. For example, for a 9 slot 6 pole motor there can exist (amongst others) an $18^{th}$ order torque harmonic which is present due to the motor design. If the phase and magnitude of the motor torque harmonic is known then the algorithm can actively cancel out the motor harmonic by applying the same signal in anti-phase (in addition to cancelling out the inverter non-linearity). It is likely that these parameters will vary with motor speed and load and as such this would need to be accounted for.

Scheduling of the Correction Algorithm

A limitation of the techniques described above is that at low motor speeds the DC component cannot be easily isolated (and at zero speed is impossible to isolate). As a result a limit should be placed on the minimum electrical frequency at which the algorithm may operate. Similarly, it may be necessary to have an upper operating speed for the algorithm to avoid aliasing problems if the sample rate of the algorithm is not sufficiently high.

To minimise torque disturbances during the enabling and disabling of the algorithm the use of hysteresis on the operating speed limits may be used and/or the control action may be ramped on and off linearly over a period of time (or number of electrical cycles).

When the algorithm is disabled a number of options are available, and the control system may be arranged to do any one or more of the following:

1. Fix the control action at the last calculated value (for the harmonic compensation algorithm the variation of position will still continue to generate the corrective action at the required harmonic frequency).
2. Switch to an alternative harmonic compensation algorithm.
3. Disable the harmonic compensation completely.

Compensating More than One Harmonic Simultaneously

Depending on the motor and inverter designs, it is common for harmonics to be present at several harmonic frequencies. This algorithm can cancel several frequencies simultaneously by combining multiple harmonic compensation algorithms in parallel. This is because the controllers operate completely independently at different frequencies.

Figure 8:
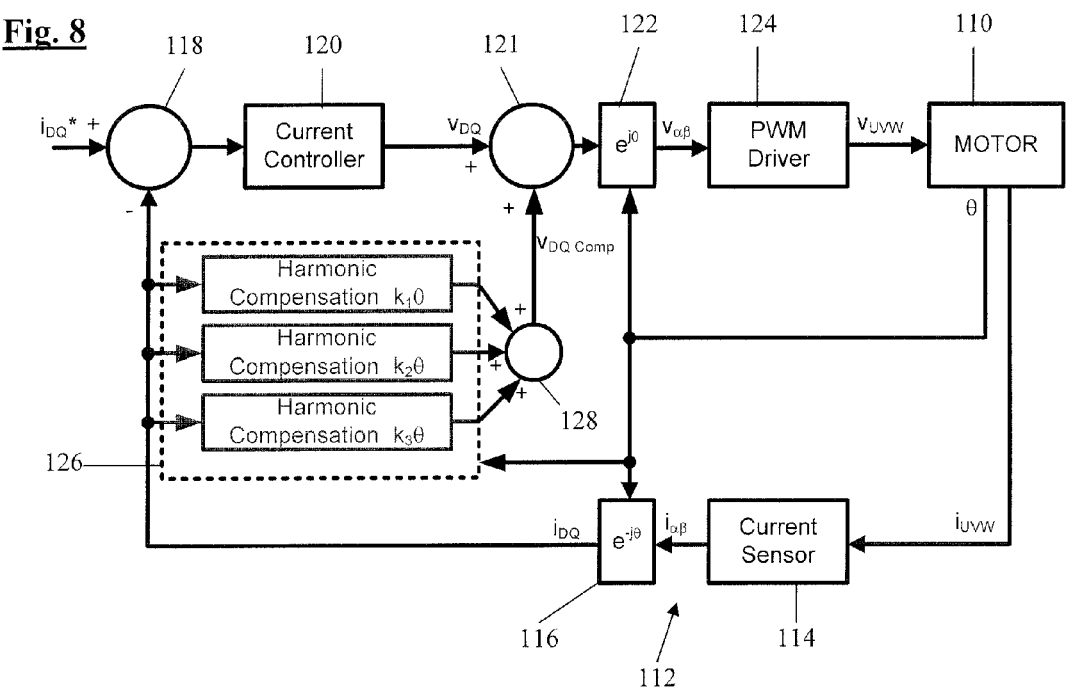
FIG. 8 is a diagram of a control system according to a further embodiment of the invention.

Referring to FIG. 8 a motor control system according to a further embodiment of the invention comprises the same features as that of FIG. 3, with like parts indicated by the same reference numerals increased by 100. In this case the harmonic compensation controller 126 is arranged to correct, or inject, a number of different harmonics $k_1$, $k_2$, $k_3$ using respective harmonic compensation control algorithms. Each of the algorithms is arranged to generate a respective voltage correction signal as described above, and the correction signals are combined by an adder 128 to produce a combined correction signal which is combined with the voltage demand output from the current controller 120. Each of the harmonics can be to correct distortion in the motor drive signals or to correct harmonic torque errors inherent in the motor as described above, or to correct other harmonic errors or distortions.

It will be appreciated that the number and order and sign of the harmonics that the compensation sub-algorithms are arranged to correct will depend on the nature of the current sensing system and the harmonic distortions that it produces. For example in some cases there may be two sub-algorithms arranged to correct two harmonics. These can be of the same order and different signs, of different order and the same sign, or of different order and different sign. In some cases there may be three sub-algorithms as shown in FIG. 8. In this case the three harmonics can be made up of two of the same order and opposite sign and one of a different order (and either sign), or three different orders, and all positive, all negative, two negative and one positive, or two positive and one negative.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A control system for an electric motor, said control system comprising:
   a current sensing means arranged to produce a current sensing output indicative of electric current in said motor,
   current control means arranged to receive said current sensing output and to output a voltage demand indicative of voltages to be applied to said motor, and
   voltage demand correction means arranged to generate a correction signal and to use said correction signal and said voltage demand to produce a corrected voltage demand, wherein
   said voltage demand correction means is arranged to monitor the current sensing output thereby to measure distortion in the voltage demand, and to generate the correction signal so as at least partly to correct the distortion,
   said voltage demand correction means is arranged to identify a distortion frequency and identify a component of said current sensing output having a frequency equal to said distortion frequency, and to measure the magnitude of said component to measure said distortion, and said voltage demand correction means is arranged to transform said current sensing output so that said component becomes a DC component, and to measure the magnitude of said DC component.

2. The control system according to claim 1 wherein said voltage demand correction means is arranged to generate said correction signal so as to reduce said identified component.

3. The control system according to claim 1 wherein said voltage demand correction means is arranged to generate said correction signal at a fixed magnitude so as to correct a torque harmonic of said motor.

4. The control system according to claim 1 wherein said voltage demand correction means is arranged to combine said correction signal with said voltage demand to produce said corrected voltage demand.

5. The control system according to claim 1 for said motor having stationary windings and a rotor which rotates relative to said windings, wherein said current sensing means comprises a current sensor arranged to measure current in said motor windings and transformation means arranged to transform said measured current into a frame of reference of said rotor.

6. The control system according to claim 1 wherein said current control means is arranged to output said voltage demand so as to define a demanded voltage in a frame of reference which is rotating.

7. The control system according to claim 1 which is arranged to correct a plurality of components of distortion.

8. The control system according to claim 7 wherein said plurality of components of distortion are harmonics having different frequencies and/or different signs.

\* \* \* \* \*